US012379283B2

(12) United States Patent
Shet

(10) Patent No.: US 12,379,283 B2
(45) Date of Patent: Aug. 5, 2025

(54) METHOD FOR IDENTIFYING FAULTS IN A DRIVE

(71) Applicant: Innomotics GmbH, Nuremberg (DE)

(72) Inventor: Rohan Mangalore Shet, Nuremberg (DE)

(73) Assignee: Innomotics GmbH, Nuremberg (DE)

( * ) Notice: Subject to any disclaimer, the term of this patent is extended or adjusted under 35 U.S.C. 154(b) by 176 days.

(21) Appl. No.: 18/031,095

(22) PCT Filed: Oct. 14, 2021

(86) PCT No.: PCT/EP2021/078482
§ 371 (c)(1),
(2) Date: Apr. 10, 2023

(87) PCT Pub. No.: WO2022/079185
PCT Pub. Date: Apr. 21, 2022

(65) Prior Publication Data
US 2023/0375440 A1    Nov. 23, 2023

(30) Foreign Application Priority Data
Oct. 15, 2020  (EP) ..................................... 20202126

(51) Int. Cl.
G01M 13/045    (2019.01)
G01M 13/028    (2019.01)

(52) U.S. Cl.
CPC ........ G01M 13/045 (2013.01); G01M 13/028 (2013.01)

(58) Field of Classification Search
None
See application file for complete search history.

(56) References Cited

U.S. PATENT DOCUMENTS 5,852,793 A * 12/1998 Board ................. G01M 13/045
                                                    702/56
5,875,420 A *  2/1999 Piety ..................... G01M 15/12
                                                    702/56

(Continued)

FOREIGN PATENT DOCUMENTS

EP    1304463 B1    9/2005
RU    2045751 C1   10/1995

(Continued)

OTHER PUBLICATIONS

Mais, Jason et al.; "Spectrum Analysis The key features of analyzing spectra", May 31, 2002 (May 31, 2002), SKF USA Inc., pp. 1-32, XP055784336, Known from Internet:URL:https://www.skf.com/binaries/pub12/images/0901d1968024acef-CM5118-ENSpectrum-Analysis_tcm_12-113997.pdf [found on Mar. 10, 2021], Chapter 1-4.

(Continued)

Primary Examiner — Huy Q Phan
Assistant Examiner — Carl F. R. Tchatchouang
(74) Attorney, Agent, or Firm — Henry M. Feiereisen LLC

(57) ABSTRACT

Disclosed is a method for identifying faults in a drive. A normalized spectrum is determined, which is dependent on a speed. Peak values in the spectrum are identified. A first peak value is identified at a first frequency and a second peak value is identified at a second frequency. A pattern is identified based on the first frequency and the second frequency.

10 Claims, 5 Drawing Sheets

(56) References Cited

U.S. PATENT DOCUMENTS

| | | | |
|---|---|---|---|
| 5,895,857 A | 4/1999 | Robinson et al. | |
| 5,922,963 A * | 7/1999 | Piety | G01N 29/46 |
| | | | 73/659 |
| 6,999,884 B2 * | 2/2006 | Astley | G01M 13/045 |
| | | | 702/56 |
| 7,231,303 B2 | 6/2007 | Griessler et al. | |
| 2003/0066352 A1 | 4/2003 | Leamy et al. | |
| 2016/0245686 A1 * | 8/2016 | Pal | G01M 13/045 |
| 2019/0339687 A1 * | 11/2019 | Cella | G05B 13/028 |

FOREIGN PATENT DOCUMENTS

| | | | | |
|---|---|---|---|---|
| RU | 2379645 C2 | 1/2010 | | |
| RU | 2475717 C2 | 2/2013 | | |
| RU | 2578044 C1 | 3/2016 | | |
| WO | WO-2020023627 A1 * | 1/2020 | | G01C 21/16 |

OTHER PUBLICATIONS

PCT International Examination Report and Written Opinion of International Examination Authority mailed Jan. 27, 2022 corresponding to PCT International Application No. PCT/EP2021/078482 filed Oct. 14, 2021.

* cited by examiner

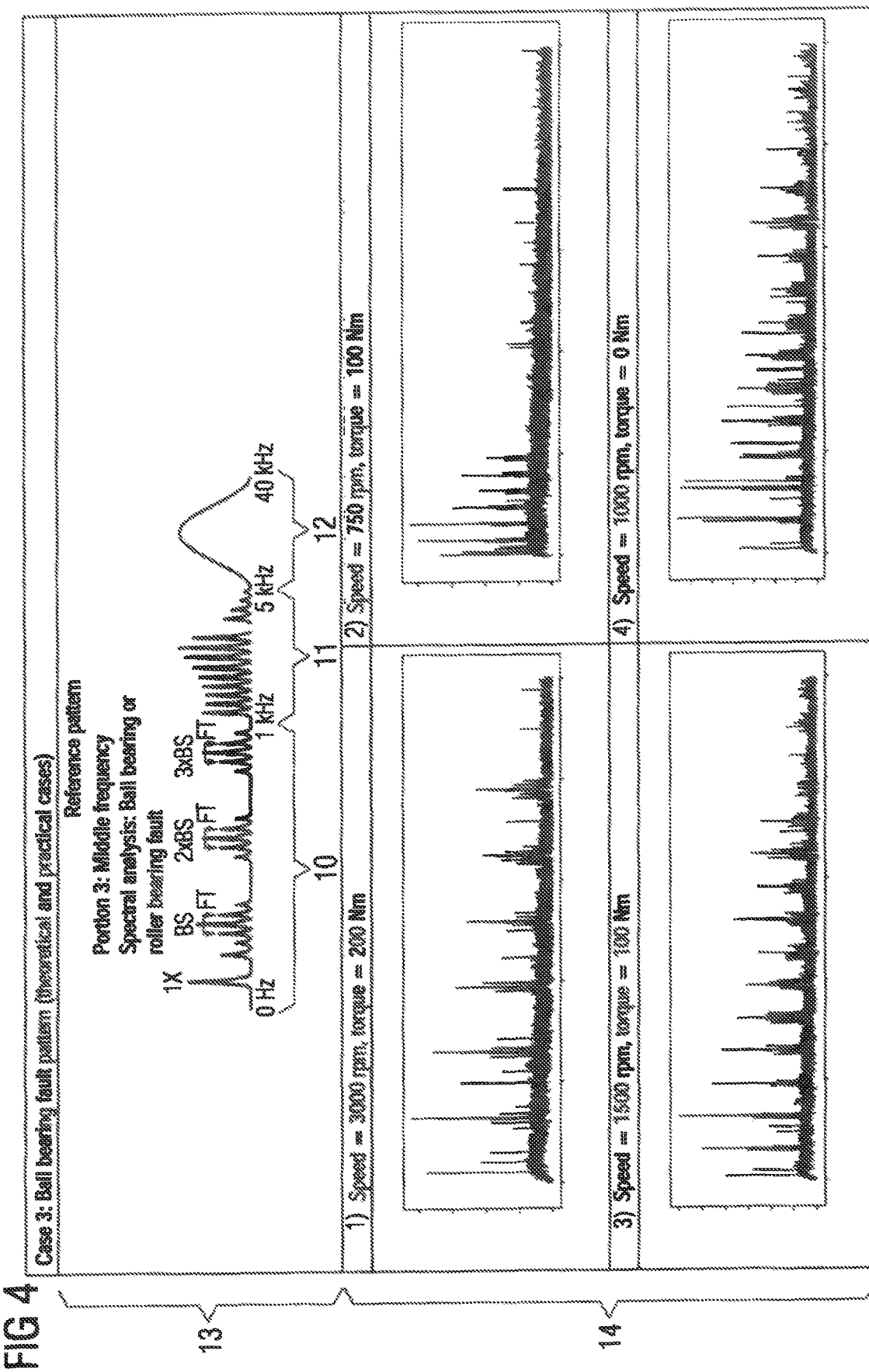

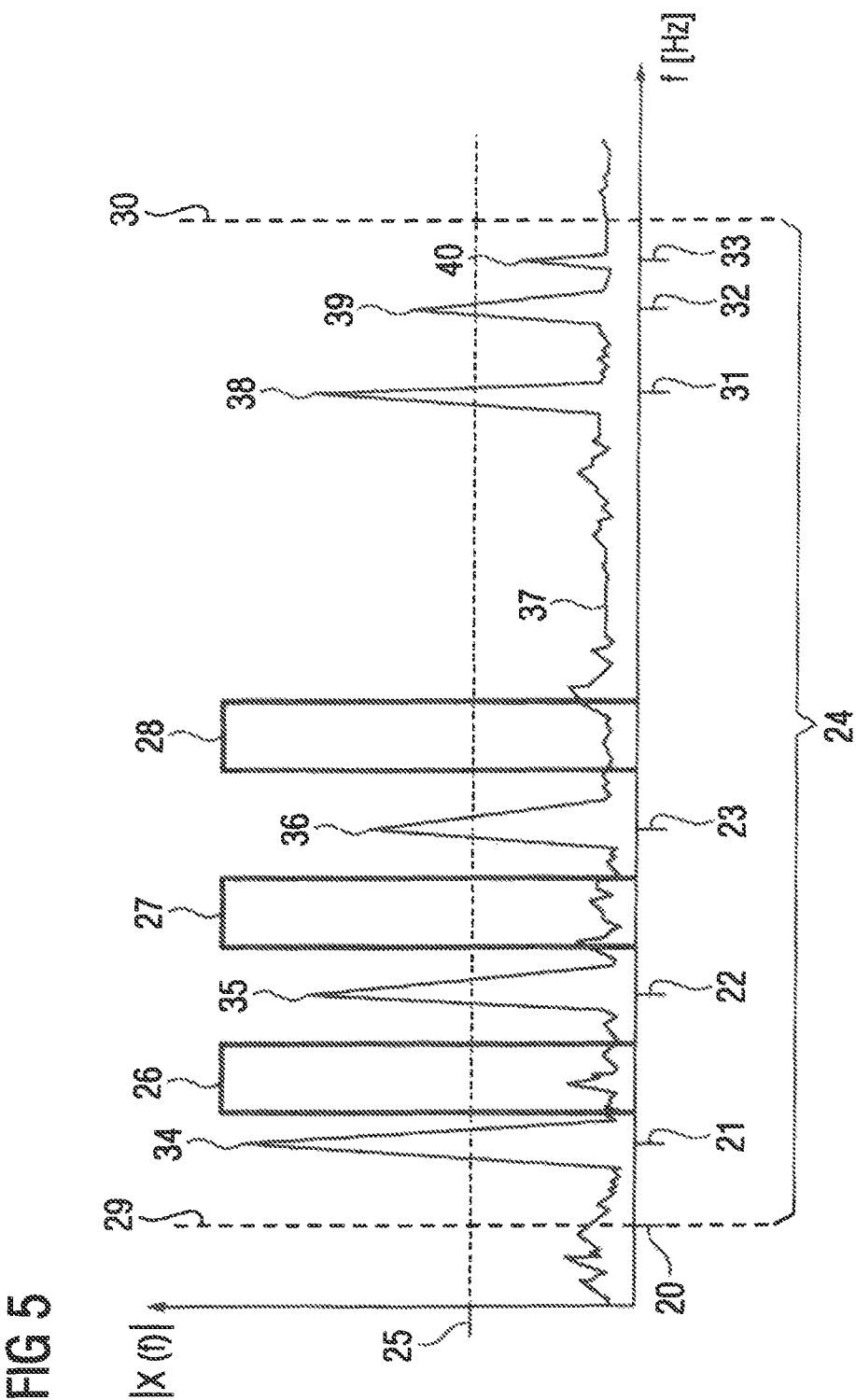

METHOD FOR IDENTIFYING FAULTS IN A DRIVE

CROSS-REFERENCES TO RELATED APPLICATIONS

This application Is the U.S. National Stage of International Application No. PCT/EP2021/078482, filed Oct. 14, 2021, which designated the United States and has been published as International Publication No. WO 2022/079185 A1 and which claims the priority of European Patent Application, Serial No. 20202126.7, filed Oct. 15, 2020, pursuant to 35 U.S.C. 119 (a)-(d).

BACKGROUND OF THE INVENTION

The invention relates to a method for fault recognition in a drive.

A drive has, for example, an electric machine, a transmission, a V-belt, a power converter, etc. The drive also has, for example, one or more bearings. The bearing or bearings are, in particular, part of the electric machine or the transmission, etc. The electric machine is, for example, a high voltage electric motor. Such motors are utilized in many manufacturing industries, for example. A timely servicing of these machines is a key aspect of offering to the customer an uninterrupted operation and/or service for such systems. An aim therein can be, for example, an early prediction of mechanical faults in the moving elements of an electric motor and to offer the possibility to issue a timely alarm to the operator of a system and/or a motor and/or to a client service team, in order to prevent an unplanned down time of the machine and/or the system.

From EP1304463 B1, for example, there is known a method for monitoring the state of a bearing which is arranged on one end of a rotatable shaft, wherein a vibration sensor monitoring the bearing is arranged on the other end of the rotatable shaft, but in the vicinity thereof. In the method, a broadband signal is established by the vibration sensor, by means of which the bearing is monitored for a defect.

From U.S. Pat. No. 7,231,303 B2, there is known a vibration sensor for monitoring the state of a rotating component. An evaluating electronic system available for this has an analogue-digital converter and a signal processing apparatus with a plurality of signals which have been captured by the sensor element and are therefore diagnosable.

From U.S. Pat. No. 5,895,857 A, there is known a signal processing apparatus for processing machine vibrations. Therein, a peak value detector is used to determine peaks in the vibration amplitude during predetermined sampling periods.

It is an object of the invention to improve fault recognition in a drive.

SUMMARY OF THE INVENTION

A solution to the problem is provided with a method as set forth hereinafter. Embodiments are disclosed in dependent claims. Furthermore, a solution to the problem Is provided by a computer program product as set forth hereinafter. The advantages and preferred embodiments disclosed below in relation to the method can be transferred accordingly to the computer program and the computer program product.

In a method for recognizing faults in a drive, a normalized spectrum is established, a normalized frequency spectrum. The fault recognition relates therein, for example, not only to a fault, but also to wear in a component or wear in a plurality of components of a drive. The component is, for example, a bearing, a coupling and/or a transmission. An instance of wear, in particular above a threshold value, can also be characterized as a fault. Not every fault automatically leads to a shutdown of the drive. Examples of measures in the event of a fault are a reduction in the maximum speed, a reduction in the maximum acceleration, a reduction in the maximum loading of the bearing and/or transmission, the planning of a repair and/or an exchange of the faulty bearing and/or the faulty transmission. The spectrum relates, for example, to a speed, a derivative of the speed (in particular, an acceleration), a vibration (wherein a vibration can be dependent upon a speed), and/or values of identical or similar type. The speed relates, for example, to the rotary speed of a bearing, a transmission, a motor, a generator, a coupling, etc. The vibration relates, for example, to the vibration of a bearing, a transmission, a motor, a generator, a coupling, etc. The vibration is recorded, for example, by means of a vibration sensor, wherein the vibration is recorded, in particular, on a housing or within a transmission. The vibration is evoked, in particular, by a movement. The movement relates, in particular, to a rotary movement, and thus also a speed (in particular a rotary speed). A bearing fault can be evoked during rotation of a component by means of the bearing, for example, a vibration. This vibration is thus also dependent upon a speed, the rotary speed. Advantageously, the spectrum is normalized. Thus, for example, a threshold value, for example a minimum value, can be specified and/or changed, independently of the place of use and/or usage time of the method. This therefore relates, for example, to the use of the method with different types of bearings. For example, by way of the normalization, an advantage is gained in the observation of at least one or more peak values within the spectrum.

In one embodiment of the method, a normalized spectrum is established which depends upon a speed, wherein peak values in the spectrum are recognized, wherein a first peak value is recognized at a first frequency, wherein a second peak value is recognized at a second frequency, wherein on the basis of the first frequency and the second frequency, a pattern is recognized. Peak values in a spectrum can also be designated peaks.

In one embodiment of the method, this is based upon the recognition of frequency ratios, that is in particular the x-times frequencies of different peak values (maxima). Thus, the disadvantage of narrow passbands for recognizing a single maximum can be avoided.

In a method for fault recognition in a drive, a normalized speed spectrum can thus be established, wherein a first peak value is recognized and wherein a first pattern is recognized. The speed is, for example, a rotary speed. By way of the recognition of the peak value and/or the pattern in the normalized speed spectrum, faults can be recognized. Therein, a peak value and/or a pattern which deviates from normal operation is recognized. The deviation can result from a fault. Thus, for example, a fault in a drive belt such as a belt misalignment, can be recognized.

In order to recognize, for example, a fault in a bearing, dependent upon a particular bearing and dependent upon a particular fault pattern, a fault pattern can be stored and this stored fault pattern can be recognized. In order to preclude interfering influences, only particular frequency ranges are observed in which, in the event of an error, a peak value must in each case occur. This observation of predetermined frequency ranges takes place, for example through the use of bandpass filters. With this procedure, a fault is only recognized if the peak values fall within the range of the bandpass filters. The bandpass filters serve for recognizing the fault pattern. Thus, if the frequencies become displaced, e.g. due to external influences, a fault is no longer recognized.

If a pattern is recognized on the basis of the peak values and the frequencies belonging to the peak values, since a pattern results therefrom, the recognition is independent of potentially too narrow bandpass filters.

In one embodiment of the method, the pattern relates to the frequencies and/or the amplitudes of the peak values, wherein in particular, the frequencies are multiples of one another. By way of the observation of the amplitudes, a peak value can be recognized in that it exceeds a minimum value. The peak value that is identified and/or recognized in this way has an associated frequency. From this, there result different frequencies at the peak values. From the various frequencies at the peak values, in particular, a dependency and/or relationship to one another can be recognized. Thus, a frequency of a peak value can be a multiple of a further frequency of a further peak value. Patterns result, in particular, from multiples of frequencies being recognized, these being associated, respectively, with peak values. Thus, a fault pattern can be recognized, even if the pattern of this fault becomes displaced in the frequency domain.

In one embodiment of the method, therefore, the peak value and/or the peak values is/are recognized by an exceeding of a first minimum value (threshold value and/or limit value). The first minimum value and/or further minimum values are, for example, settable.

In a further embodiment of the method, at least one of the peak values has lateral peak values in side bands, wherein in particular the lateral peak values are recognized through an exceeding of a second minimum value. The peak values of side bands (lateral peak values) can also contribute, in particular, to the recognition of a fault and be part of a pattern.

In one embodiment of the method, therefore, the pattern is also recognized dependent upon lateral peak values in side bands. This contributes to the reliability of the recognition of a fault, since a more complex pattern is to be recognized.

In one embodiment of the method, a plurality of patterns are stored, wherein at least one fault is associated with a plurality of the patterns in each case. Thus by way of different patterns, different faults can be recognized. A plurality, for example, of faults can also be associated with one pattern. For example, a plurality of patterns can also be associated with one fault. In this way, for example, the recognition of the fault can be improved.

In one embodiment of the method, a fault relates to a wear. Therefore, in particular, a wear of a bearing, transmission and/or a coupling can also be recognized. From this, for example, an exchange or a servicing of a bearing, transmission and/or a coupling can be planned.

In one embodiment of the method, as the spectrum, a normalized acceleration spectrum is established and/or a normalized speed spectrum, wherein in particular, different patterns are recognized in different spectra. Advantageously, dependent upon faults that are to be recognized, a suitable spectrum can be observed.

In one embodiment of the method, a normalized acceleration envelope curve spectrum is established, wherein a second peak value is recognized and wherein also a second pattern is recognized. Thus, for example, a bearing fault and/or a fault in a transmission and/or in a transmission element can be recognized.

In one embodiment of the method a vibration analysis is carried out in the frequency domain of the spectrum on the basis of the normalized speed spectrum.

In one embodiment of the method a vibration analysis is carried out in the frequency domain of the spectrum on the basis of a normalized acceleration envelope curve.

In one embodiment of the method a vibration analysis is carried out in the frequency domain on the basis of the normalized speed spectrum. Thus, for example, faults which are associated with a machine, such as for example, an alignment fault or a loosening of a fastening of the machine, can be recognized.

In one embodiment of the method, a vibration analysis is carried out in the frequency domain on the basis of a spectrum of the normalized acceleration envelope curve. The vibration analysis in the frequency domain is carried out, in particular, on the basis of expert knowledge (with the aid of bearing information) using spectra of the normalized acceleration envelope curve, in order to recognize faults that belong to a bearing element.

In one embodiment of the method, a statistical inference is applied to a time-domain statistical analysis, such as skewness and kurtosis. It is thus possible to recognize an abnormal behavior in the vibration signal.

In one embodiment of the method, an artificial intelligence system is used in order to recognize a pattern. Such an artificial intelligence system is, in particular, trainable. For training, information relating to the drive, for example, the nominal power, peak power, nominal rotary speed, maximum speed, etc. can also be used.

In one embodiment of the method, an operating state of the drive is used for fault recognition. Thus, for example, it is possible to differentiate whether vibrations occur during standstill, during an acceleration phase or only during high rotary speeds. Dependent upon these operating states, a frequency spectrum can then be analyzed.

In one embodiment of the method, the vibration analysis is carried out on the vibration data that is captured by vibration sensors that are mounted on the drive side and on the operating side of the machine. The sensors can be mounted, for example, in different orientations in relation to the rotary axis of the motor: axially, vertically or horizontally. For example, the vibration analysis can additionally be based upon a simple threshold value formation of KPIs in the time domain, such as for example, RMS value, crest factor, peak-to-peak, kurtosis and skewness/skew. It is also possible, for example, to base the vibration analysis on a spectral analysis, wherein the vibration signal in the time domain is transformed into the frequency domain and analyzed. Thus, for example, predefined regions of the spectra which belong to bearing faults can be monitored and if the spectral peaks of this region are above the preset threshold value, a fault is recognized and notified. Key information on the spectral ranges which belong to roller bearing faults can be found in roller bearing data sheets.

In one embodiment of the method, a vibration analysis tool receives vibration data. Vibration data of this type can be evaluated in the tool by way of calculations. The vibration analysis tool is, for example, at the location of the monitored machine or spaced from this location, so that data needed therefor is transferred, for example, via the Internet to the vibration analysis tool. The calculation relates, for example, to vibration spectra in the frequency range, vibration statistics in the time domain and/or operating states of the monitored machine.

In one embodiment of the method, therefore, at least one of the following calculations and/or analyses takes place:

vibration spectra in the frequency domain (speed and acceleration envelope curve spectra), time domain statistics such as expectancy value, variance, skewness and/or kurtosis, operating states of the machine which are defined, in particular, on the basis of rotary speed and torque of the machine at a given time point.

In one embodiment of the method, important asset information items such as bearing type, application details, for example toothed gear transmission, belt transmission are stored and used in the analysis of the measured actual values such as a speed or a vibration. Thus, a motor damage recognition can use this data for recognizing faults which belong, for example, to different moving elements of the electric machine such as bearing elements, belts or transmissions.

In one embodiment of the method, spectra of captured data and/or actual values are normalized in relation to amplitude and rotary speed in order to obtain amplitude-normalized order spectra. Thus, an algorithm for normalizing can be made robust in relation to different operating states. The amplitude normalization is based, for example, on a spectral z-valuation.

In one embodiment of the method, at least two of the following steps are applied in parallel, since they are independent of one another a) carrying out a vibration analysis in the frequency domain on the basis of expert knowledge, using normalized speed spectra in order to recognize faults that belong to the machine, for example, alignment faults, loosening, b) carrying out a vibration analysis in the frequency domain on the basis of expert knowledge (with the aid of bearing information) using spectra of the normalized acceleration envelope curve, in order to recognize faults that belong to the bearing element, c) carrying out a statistical inference on the basis of time-domain statistics such as skewness and kurtosis in order to recognize abnormal behavior in the vibration signal, d) using a peak and pattern recognition module on normalized speed spectra in order to recognize faults in the drive belt, such as belt misalignment, e) using the peak and pattern recognition module on normalized acceleration envelope curve spectra in order to recognize faults in bearings or in the transmission element.

The steps [a-c] are steps for recognizing bearing faults in a machine by means of vibration analysis. The peak and pattern recognition module for recognizing peak values and patterns is not only robust in relation to deviations in the bearing information, but also offers the possibility where bearing information is lacking, of recognizing bearing defects. The peak and pattern recognition module also enables the recognition of non-bearing faults, such as a belt off-track running and/or a defective transmission.

In one embodiment of the method, to recognize peak values and patterns, the module uses the vibration spectrum as an input signal. In particular, it applies a threshold value to the spectrum and removes relatively small less prominent peaks since these peaks do not contain any information on the faults.

In one embodiment of the method, it is evaluated in one step whether one of the prominent peaks contains whole-number multiple harmonics. This is performed, in particular, for all peaks. Peaks are formed which do not contain any harmonics or when the peak is already a harmonic of a significant peak of lower order. In this way, peaks with harmonics are obtained. Peaks with harmonics can be an indication of a fault. As soon as these peaks have been established, a fault type can be narrowed down in that the spectral pattern round these peaks and their harmonics are evaluated.

In one embodiment of the method, the results from [a-e] are analyzed with the aid of expert knowledge and/or artificial intelligence, in order to draw conclusions regarding a possible defect and its severity.

In one embodiment of the method, for example, a motor damage recognition is triggered in a timely manner if all the steps given above in the portion [a-e] are carried out. The output can be a visual graphic for an operator. It is also possible, for example, to generate an elaborate report with detailed graphics and a historical analysis.

In one embodiment of the method, given an automatic vibration analysis in the frequency domain, bearing information for its functionality can be dispensed with. Thus, the analysis is no longer dependent upon knowledge of exact bearing fault frequencies. In many cases, the bearing information is inexact or not available, which could have led to poor performance or a complete failure in the recognition of faulty bearing elements. In contrast to many techniques of machine learning for pattern recognition, the method described does not require a large amount of training data. The method described offers a robust technique for overcoming the dependency on bearing information.

By way of one of the described methods, it is possible, for example, also to monitor very old machines for which the bearing information is not available. By means of one of the methods described, it is possible to obtain reliable information regarding the state of health of the system and/or to provide timely information about a potential defect.

In one embodiment of the method, current values or values derived therefrom (e.g. vibration data from the electric motor) are transferred via the Internet and an analysis of the data by means of a cloud application is enabled.

In one embodiment of the method, it is provided on scalable instances by means of a cloud application, that is web-based, in a suitable Python environment. This has the advantage of enabling a process automation. The method is implemented, for example, by algorithms which are based upon expert knowledge and pattern mining.

In one embodiment of the method, a combination of different techniques is used. These are, especially:

a) statistical derivation of time domain-based KPIs of vibration data, b) vibration analysis in the frequency domain using a pre-defined spectral threshold value calculation on the basis of expert knowledge (threshold value calculation for the definition of a faulty and a non-faulty state) and bearing information, c) spectral threshold value determination of peak patterns, which have been obtained from the recognition of novel peak and pattern recognitions, which is developed, in particular, on the basis of expert knowledge.

A final decision is based, in particular, upon the combined results from a), b) and c).

In one embodiment of the method, in the absence of bearing information, the algorithm relies upon a), c) to make a decision. In the presence of bearing information, the algorithm uses, in particular a), b), c) to make a decision.

In one embodiment of the method, main maxima are recognized in a spectrum. For these recognized main maxima, subsidiary maxima are recognized, each of which represents a side band of the main maximum. From the pattern of the main maxima and the subsidiary maxima, by way of an analysis apparatus, a particular fault is inferred. This analysis apparatus has, in particular, an artificial intelligence system.

A computer program product can be provided, having computer-executable program means and, on execution on a computer apparatus with processor means and data storage means, is suitable for carrying out a method according to a manner as described. An underlying object can thus be achieved by a computer program product which can also serve to simulate an operational behavior. The computer program product is provided, in particular, for installation on a computing unit associated with a control apparatus, wherein the computer program product is designed, on execution on the computing unit, to carry out the method described.

BRIEF DESCRIPTION OF THE DRAWING

The features of the individually claimed and/or described subject matter items can be combined with one another without difficulty. The invention will now be described and explained in greater detail making reference to the drawings. The features shown in the drawings can be combined into new embodiments without departing from the invention. Similar elements are given the same reference signs. In the drawings:

FIG. 4 shows a third case with a spectral analysis,
and
FIG. 5 shows a fourth case with a spectral analysis.

DETAILED DESCRIPTION OF PREFERRED EMBODIMENTS

Figure 1:
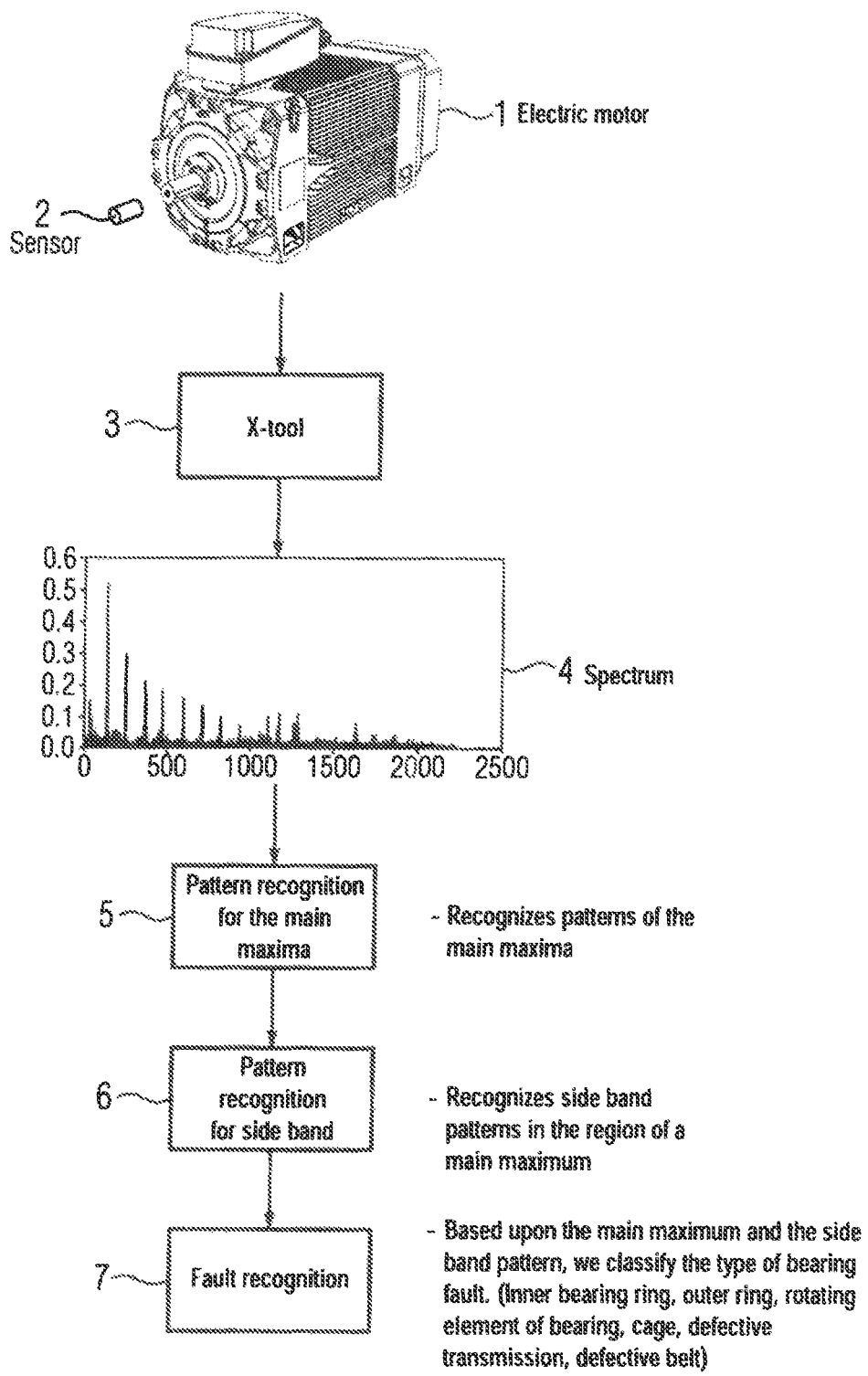
FIG. 1 shows an electric machine with a data analysis.

The representation of FIG. 1 shows an electric motor 1 and a sensor 2 for recording actual values. The actual values are received by an analysis apparatus 3, and a spectrum 4 is formed. In a subsequent step 5, a pattern of main maxima (that is, the essential maxima) is recognized. In a further step 6, patterns of side bands, which each belong to the respective main maxima, are recognized. In a further step 7, on the basis of the preceding steps (patterns of the main maxima and patterns of the side bands), faults are recognized. Such faults can be classified according to types of bearing faults. Such types are, for example: bearing inner ring, bearing outer ring, rotating element of the bearing, cage, faulty transmission, faulty drive belt.

Figure 2:
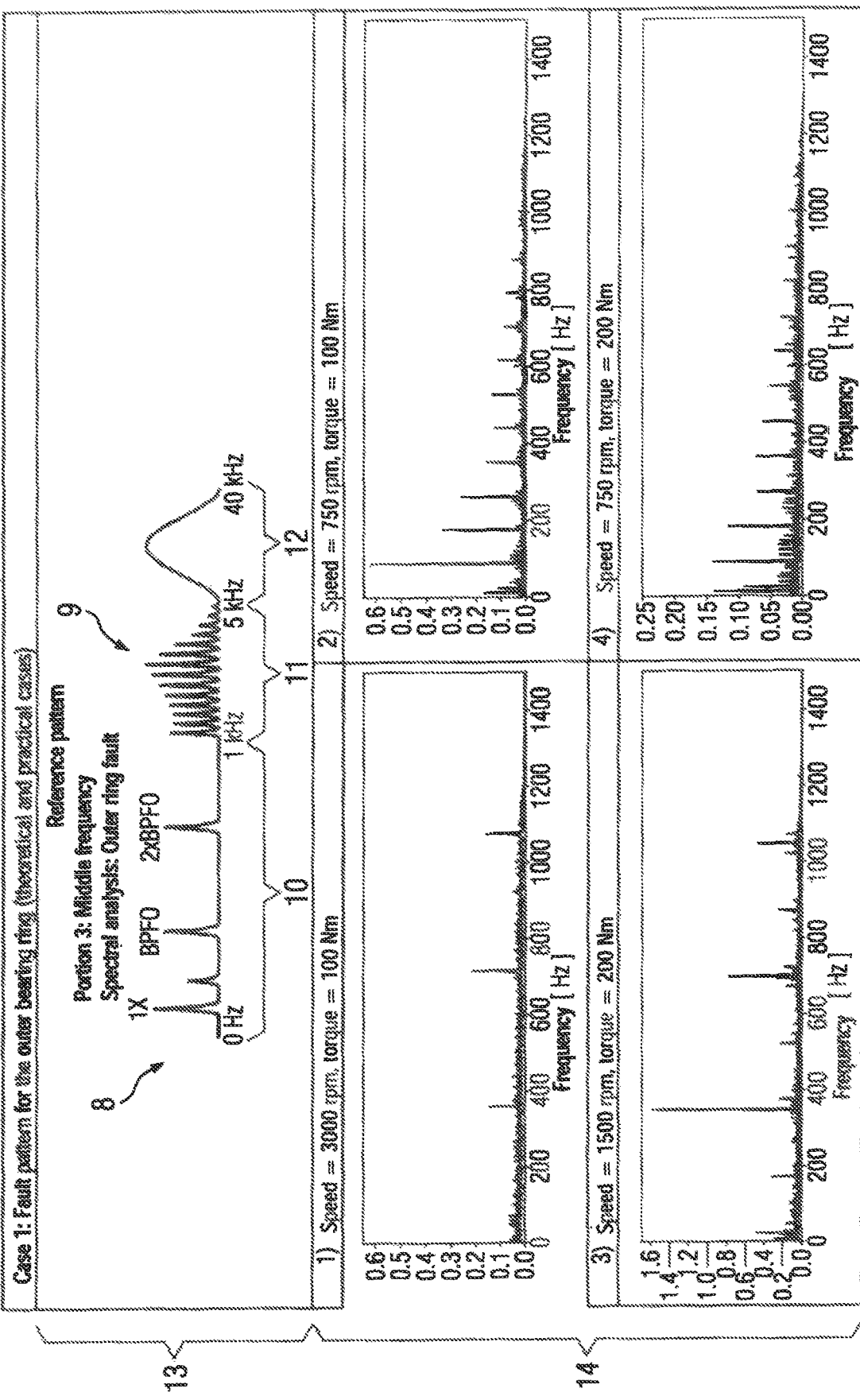
FIG. 2 shows a first case with a spectral analysis.

The representation in FIG. 2 shows a first case with a spectral analysis. FIG. 2 shows theoretical and practical fault patterns in the event of a fault in a bearing element. What is shown is a spectrum in three regions 10, 11 and 12, wherein these regions relate to a theoretical representation 13. The region 10 relates to a particular speed. The region 11 relates to an acceleration. The region 12 relates to high frequencies. From this there results a spectrum for the speed 8 and a spectrum for the acceleration 9. Also shown is the BPFO (ball pass frequency outer race) with a maximum and double this frequency with a further maximum (2×BPFO). In a representation of real values for spectra in the region 14, different patterns arise at different speeds and different torques.

Figure 3:
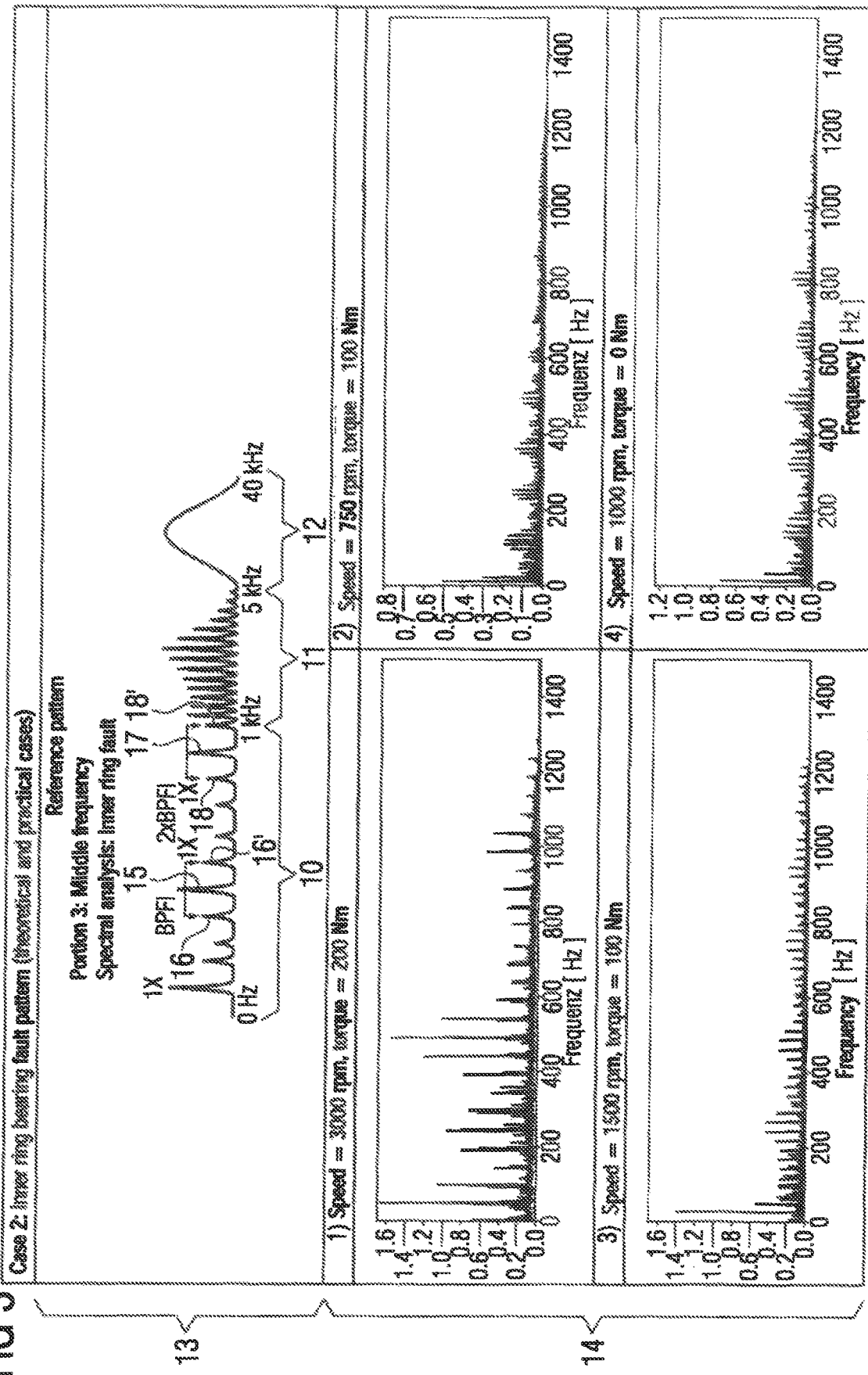
FIG. 3 shows a second case with a spectral analysis.

The representation in FIG. 3 shows a second case with a spectral analysis. FIG. 3 shows spectra and fault patterns for a BPFI (ball pass frequency inner race). What are shown are main maxima 15 and 17, that is peak values, and their associated side bands 16 and 16' with the lateral peak values, for the main maximum BPFI and side bands 18 and 18' for the further main maximum 17 with 2×BPFI. Thus, it is evident that on the basis of a pattern of a frequency analysis, particular faults and/or fault sources can be inferred.

The representation in FIG. 4 shows a third case with a spectral analysis. This third case relates to the ball spin (BS), i.e. in particular, the BSF (ball spin frequency). A fault can thus be present in the balls of a ball bearing. It is evident that here with the side bands (FT), the pattern of the maxima has had an additional characteristic impressed upon it.

Therefore, by way of a spectral pattern recognition, a detection of a fault can take place. The spectral pattern recognition is based, firstly, upon the recognition of maxima, in particular main maxima, and the recognition of subsidiary maxima of the side bands of the main maxima. From the analysis of the main maxima and subsidiary maxima, faults in a bearing can be assigned to one class of faults. These are, especially, faults in the region of the outer ring, faults in the region of the inner ring and/or faults in the balls of a ball bearing. This is also applicable, accordingly, to barrel roller bearings or needle bearings or suchlike.

The representation in FIG. 5 shows a further spectral analysis with a frequency range 24 which can be set, for example, using a bandpass filter. The frequency range 24 has a lower frequency 29 and an upper frequency 30. The normalized amplitude x(f) is plotted with its value over frequency f [Hz]. What are shown are peak values 34, 35, 36, 38 and 39, wherein these are recognized by way of the exceeding of a minimum value 25. For example, a peak 40 does not exceed this minimum value 25 and thus does not qualify as a peak value for recognizing a pattern. Frequencies 21, 22, 23, 31, 32 and 33 are each associated with the peak values 34, 35, 36, 38 and 39. Also shown are passbands 26, 27 and 28. The frequency 22 is, for example, double the frequency of the frequency 21. The frequency 23 is, for example, triple the frequency of the frequency 21. Thus, a pattern can be recognized which is based upon a recognition of a multiple of a frequency. The passbands can also be assigned in relation to a multiple. If, however, the spectrum 37 is displaced, with fixed passbands, faults can no longer be recognized if the peak values move outside the observed frequency range. Through the avoidance of such narrow passbands in order to recognize a specific peak value, the method for fault recognition is more tolerant. The fault recognition can be improved by way of patterns which are based upon the recognition of frequency ratios.

What is claimed is:

1. A method for recognizing faults in a drive with different types of bearings, the method comprising:
   storing a plurality of fault patterns with at least one fault associated with the plurality of fault patterns:
   operating the drive with a bearing at a rotary speed in at least one operating state;
   recording actual values with a sensor;
   receiving the actual values with an analysis apparatus;
   forming a spectrum from the actual values with the analysis apparatus;
   establishing a normalized spectrum from the spectrum depending upon the rotary speed;
   recognizing a first peak value at a first frequency of the normalized spectrum when an amplitude of the first peak value exceeds a first minimum value; recognizing a second peak value at a second frequency of the normalized spectrum when an amplitude of the second peak value exceeds a second minimum value, wherein the second peak value has lateral peak values in side bands;

recognizing a pattern of main maxima based on the first frequency and the second frequency and related to the frequencies and/or the amplitudes of the first and second peak values, wherein the frequencies are multiples of one another;

recognizing a side band pattern dependent upon lateral peak values in the side bands;

recognizing, with the analysis apparatus, at least one fault based on the recognized main maxima pattern, the recognized side lobe pattern and the plurality of stored fault patterns, and also using data stored as asset information including a bearing type and application detail in a database, wherein a fault pattern is recognized even if the fault pattern becomes displaced in a frequency domain; and taking at least one measure related to the drive when the at least one fault is recognized.

2. The method of claim 1, wherein a fault relates to a wear.

3. The method of claim 1, further comprising establishing the normalized spectrum as a normalized acceleration spectrum and/or a normalized speed spectrum.

4. The method of claim 3, further comprising recognizing different patterns in different spectra.

5. The method of claim 3, further comprising carrying out a vibration analysis in a frequency domain of the normalized speed spectrum.

6. The method of claim 3, further comprising carrying out a vibration analysis in a frequency domain of normalized spectrum based on a normalized acceleration envelope curve.

7. The method of claim 1, further comprising applying a statistical inference to a time-domain statistical analysis.

8. The method of claim 7, wherein the time-domain statistical analysis is skewness and/or kurtosis.

9. The method of claim 1, further comprising using an artificial intelligence system to recognize the pattern.

10. A computer program product embodied as a non-transitory computer readable medium having computer-executable program means, that when executed on a computer apparatus with processor means and data storage means, carries out a method as set forth in claim 1.

\* \* \* \* \*